United States Patent [19]

Kaplan et al.

[11] 4,071,708
[45] Jan. 31, 1978

[54] DIAL PULSE DETECTOR

[75] Inventors: Murray L. Kaplan, Cherry Hill; Terry N. Herbster, Willingboro; Alan F. Holden, Medford, all of N.J.

[73] Assignee: Telesciences, Inc., Moorestown, N.J.

[21] Appl. No.: 741,047

[22] Filed: Nov. 11, 1976

[51] Int. Cl.² .............................................. H04G 1/36
[52] U.S. Cl. .................................................... 179/16 E
[58] Field of Search ........... 179/16 E, 16 EA, 16 EC, 179/18 EA, 18 EB, 84 R, 84 A

[56] References Cited

U.S. PATENT DOCUMENTS

| | | | |
|---|---|---|---|
| 3,671,875 | 6/1972 | Pento | 179/16 E |
| 3,700,821 | 10/1972 | Savage | 179/16 EA |
| 3,828,141 | 8/1974 | De Marco | 179/16 EC |
| 3,851,110 | 11/1974 | Kelly | 179/18 EB |

*Primary Examiner*—Kathleen H. Claffy
*Assistant Examiner*—Joseph A. Popek
*Attorney, Agent, or Firm*—Edelson and Udell

[57] ABSTRACT

A dial pulse detector apparatus accurately detects the occurrence of dial pulses in the presence of adverse line conditions resulting in severe signal distortions due to inductive effects, noise and loading by other pieces of equipment. Signals greater than two different selected threshold levels are examined for, and signals less than the lower threshold are also examined for. Signals greater than the threshold levels are counted up on a time duration basis and added in a weighting arrangement. Signals less than the lower threshold are counted on a time duration basis and are subtracted from the added signals. When the combined signal counts reach a first specified count a dial pulse break signal is recognized. Signal counting is continued and when the combined signal counts reach a second specified count a dial pulse make signal is recognized, thereby completing the detection of a dial pulse. Because of the weighting system it would be possible to erroneously record the occurrence of two dial pulses in a time interval when only one dial pulse could validly occur. This is prevented by the use of a real-time counter which forces a minimum recognition time for a dial pulse break signal.

35 Claims, 3 Drawing Figures

DIAL PULSE DETECTOR

This invention relates generally to telephone subscriber lines monitoring equipment, and more particularly relates to dial pulse detector apparatus which is capable of reliably detecting dial pulses in the presence of adverse signal line conditions.

The dial pulse detector apparatus which constitutes the invention is a part of an overall larger monitoring system which includes amongst other things, an interface apparatus to which a large number of telephone subscriber lines are connected. The signals coming from the subscriber lines through the interface are routed to various parts of the overall equipment which record data for each particular call coming over the line, such as the time of occurrence, the duration, and the time that an answer occurs for each particular call. The purpose of the dial pulse detector is to record for example the occurrence of dial pulses with respect to an incoming or outgoing call on a particular subscriber line, and in order to do this the dial pulse detector must be capable of accurately identifying dial pulses so that the dialed digits are accurately determined. The dial pulses which are detected by the dial pulse detector are routed out to a memory device whose function it is to accumulate the dial pulses, and hence the dialed digits for identification of the called or calling number.

Normally encountered telephone systems utilize dialing rates from approximately 7 to 15 pulses per second. It has been determined that in order to reliably detect a dial pulse when taking into account inductive line ringing and distortions, it is necessary to take into account time intervals of a dial pulse signal which are in excess of a certain threshold level and also to take into account time intervals in which the dial pulse signal is below the minimum threshold. A complete dial pulse consists of a first interval when a "break" signal occurs followed by an immediately succeeding "make" signal level. The "make" signal level is established at the off-hook voltage level, and the dial pulse break signal level is ideally the nominal on-hook voltage level, but, because systems are generally not ideal, is usually established at a certain fraction of the nominal on-hook level, as for example the 11/12 on-hook voltage level. As will be seen subsequently, in the detailed description of the apparatus according to the invention and the typical waveforms shown in the drawings, the nominal on-hook voltage level may be normally considered to be approximately 50 volts, and the weighting system utilized also takes into account signal voltage levels higher than the nominal on-hook voltage level, as for example a plus 60 volt level, and weights such signals more heavily than on-hook signal levels of less than the 60 volt level.

Because of the severe dial pulse signal distortions which occur in systems having long lines, excessive ringing, and noise conditions, it is necessary that the dial pulse detection apparatus be capable of determining when a real dial pulse has occurred and to be capable of discriminating against spurious signals which cause the recording of incorrect digits for identifying data associated with a particular subscriber line call. Accordingly, it is a primary object of this invention to provide novel dial pulse detection apparatus which is capable of accurately detecting the presence of dial pulses on subscriber telephone lines in the presence of severe signal distortions due to inductive line ringing and noise conditions.

Another object of the invention is to provide a novel dial pulse detection apparatus as aforesaid which counts the duration of time intervals in which the signal being examined is above a certain threshold level and counts the time duration during which the signal being examined is less than a certain threshold value, and combines such data according to a weighting system in order to determine when a valid dial pulse has occurred.

It is a further object of the invention to provide a novel dial pulse detection apparatus as aforesaid in which the time duration when the dial pulse break signal is below a certain threshold value is subtracted from the time duration interval when the dial pulse break signal is above a certain threshold value, and to generate a dial pulse count signal when a valid dial pulse break signal has been detected followed by a valid dial pulse make signal.

The foregoing and other objects of the invention will become clear from a reading of the following specification in conjunction with an examination of the appended drawings, wherein.

Figure 2:
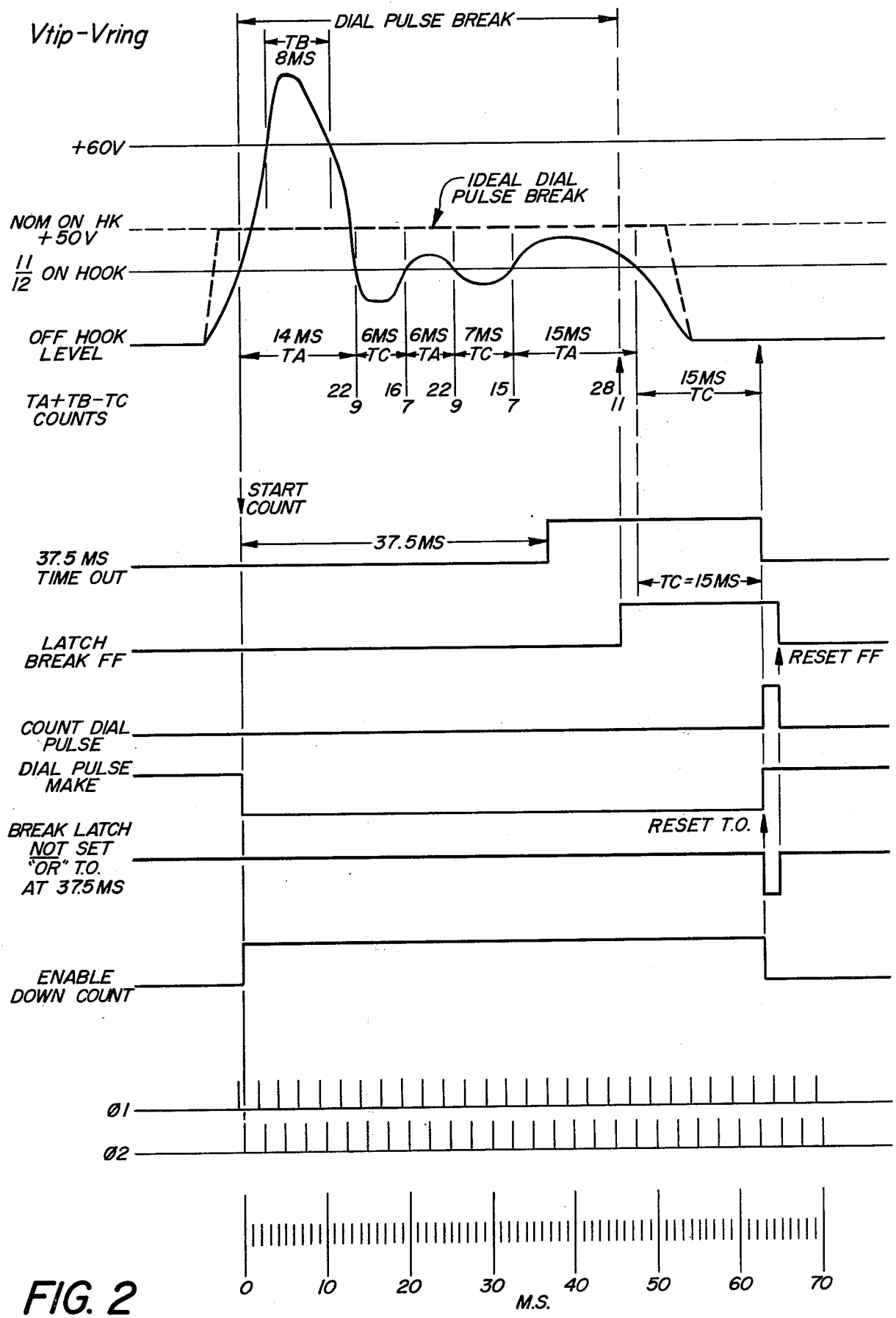
FIG. 2 is a timing waveform diagram illustrating the signals occurring at various points in the apparatus of FIG. 1 when a first kind of dial pulse signal appears on a subscriber line.

An ideal dial pulse break signal is shown in dotted line on the timing waveform of FIG. 2 and is a signal which could be readily handled by detection equipment without the occurrence of errors in detecting dial pulse digits. However, because of line conditions which could include inductive effects, noise, loading by other types of equipment and so forth, the ideal pulse does not occur in reality except in very limited circumstances. A typical type of signal would be that shown in solid line as the V tip - V ring signal showing an initial relatively large inductive pulse followed by several alternating peaks and valleys at lower levels operating about the 11/12 On Hook signal line reference before decaying off back to the Off Hook level.

Since the detectable break level is the 11/12 On Hook level, it is observed that a series of discrete intervals exist in which a detected level occurs, and a series of interspersed intervals during which a non-detected level occurs. The detected levels have been designated on the diagram as the TA intervals and the non-detected levels are designated as the TC intervals. There is additionally a level designated as TB which occurs during the first TA interval and is that time interval during which the initial inductively peaked portion of the waveform exceeds the level designated on the diagram as the +60 volt level. The TA, TB and TC intervals are combined in a weighted arrangement to determine when a valid dial pulse break has occurred. The TB interval is given twice the weighting of the TA intervals and the TC intervals are weighted equally with the TA intervals.

The weighted dial pulse break detection interval is defined as $$\Sigma TA + \Sigma TB - \Sigma TC = T \text{ milliseconds}$$

whereas the real-time dial pulse "break" plus dial pulse "make" intervals are defined as ΣTA+ΣTC, wherein the signal during the last TC interval returns to the off-hook level, where TA is the detection interval of E>11/12 on-hook, and where TC is a non-detection interval corresponding to E<11/12 on-hook.

Figure 1:
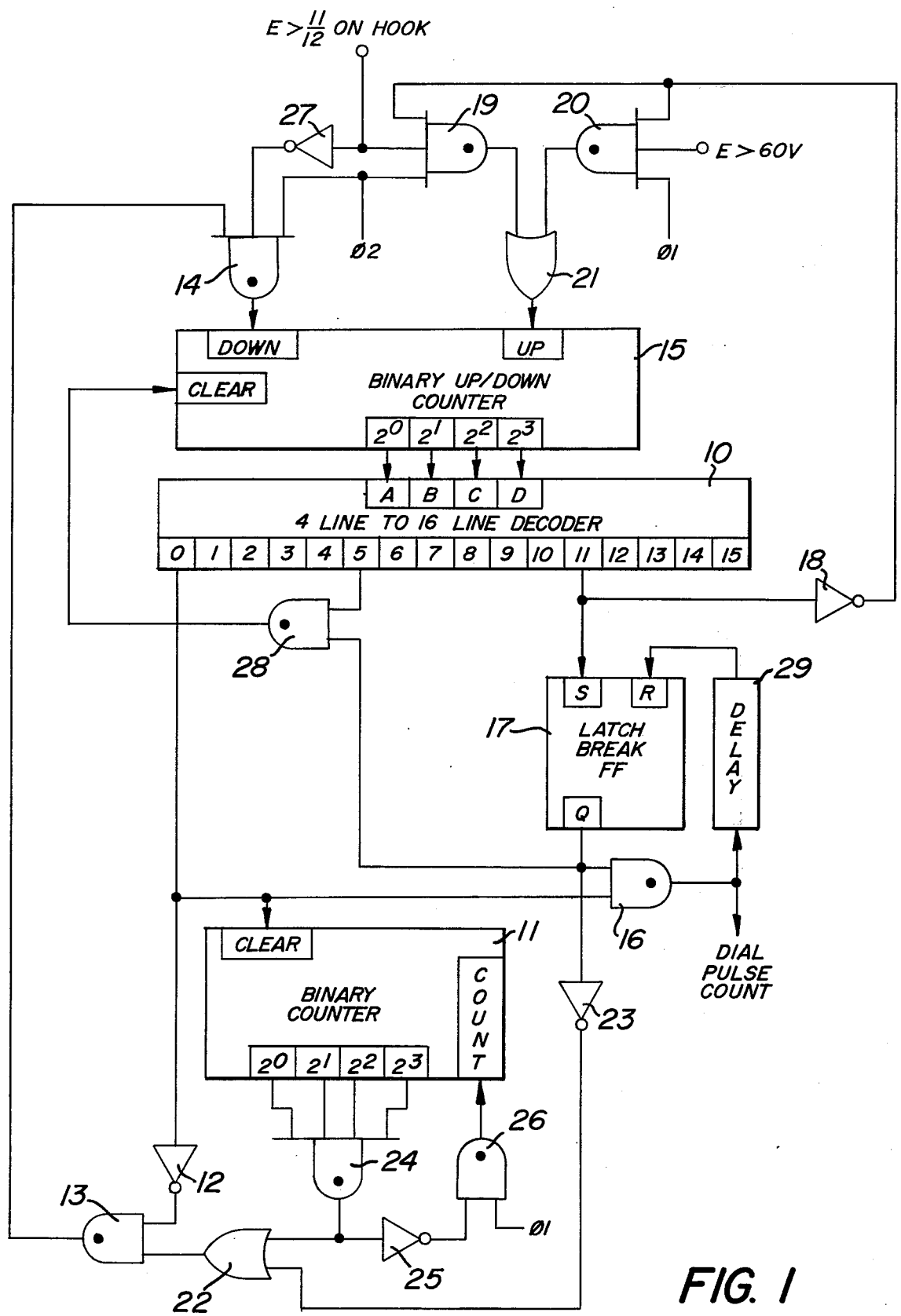
FIG. 1 is a functional block diagram of the apparatus according to the invention.

Referring now to the waveform diagram of FIG. 2 in conjunction with the functional block diagram of FIG. 1, it is observed that the input signals to the dial pulse detection apparatus are the E>11/12 on-hook signal, the E>60 volt signal and two clock pulses designated as $\phi1$ and $\phi2$. The $\phi1$ and $\phi2$ clock pulses are shown to be time displaced slightly from one another and to each occur every 2½ milliseconds. The use of the two time displaced clock pulses provides the ability to weight the dial pulse break signal for the two different voltage levels E>11/12 on-hook and E>60 volts. As will be seen from the V tip - V ring signal waveform, there are signal portions where the waveform has a value of E>11/12 on-hook and also a value greater than 60 volts, whereas there are other parts of the waveform where the amplitude is greater than 11/12 of the on-hook value but is less than the 60 volt level. The gating arrangement of the apparatus of FIG. 1 together with the time displaced clock pulses $\phi1$ and $\phi2$ provides a means for weighting the TB intervals of amplitude greater than 60 volts at twice the value of the TA intervals which are less than 60 volts but greater than 11/12 on-hook voltage level.

Assuming that the initial condition in the signal circuit is that the signal is at the off-hook level, the conditions of the apparatus in FIG. 1 will be the following. The 4 Line to 16 Line Decoder 10 is at the 0 state so that the 0 output line therefrom is high causing the Binary Counter 11 to be held at a cleared or 0 count condition. The high on the 0 output line of the Decoder 10 also appears at the input to inverter 12 and therefore appears as a low signal at and-gate 13 thereby inhibiting the gate and causing a low to appear at one of the inputs to and-gate 14 the output of which is connected to the Down count input of Binary Up/Down Counter 15, and thereby inhibiting the gate 14 so that a count down below 0 cannot be caused. The high output from the 0 count of Decoder 10 also appears as one input to and-gate 16 but cannot pass therethrough because the output of Latch Break Flip-Flop 17 is at a low level because the flip-flip is in its reset state, the reset having occurred when the previous dial pulse signal was generated. Since the Decoder 10 is in its 0 count state, the output from the 11 count of the decoder is low thereby causing a high signal to appear at the output of inverter 18 which is routed to one input of each of and-gates 19 and 20, the outputs of which gates are routed through or-gate 21 to the Up-count input of Up/Down Counter 15.

The low signal output from the Latch Break Flip-Flop 17 appears as a high signal at one input to or-gate 22 by the action of the inverter 23, but this high signal passed through to and-gate 13 is inoperative on the and-gate 13 because of the low signal placed on the other gate input by inverter 12. The low outputs from the Binary Counter 11 which appear at and-gate 24 are passed through as a low signal on the other input to or-gate 22 and to inverter 25 and is passed through the latter as a high signal at the input of and-gate 26. With and-gate 26 conditioned by the output of inverter 25, each time that a $\phi1$ signal occurs an input signal appears at the Count input of Binary Counter 11. However, no count is set into the Binary Counter 11, as previously noted, because the counter is continuously held at a clear state by the high input from the 0 count output of Decoder 10.

As long as the signal level remains at the off-hook level, or for that matter at a value less than the 11/12 on-hook value, no enabling signal appears as an input to and-gates 19 and 20 and no Up-counting occurs in the Up/Down Counter 15 irrespective of the fact that $\phi1$ and $\phi2$ pulses are continuously occurring every 2½ milliseconds. Moreover, while the E>11/12 on-hook signal is less than that value, and accordingly would be passed through inverter 27 as a high enabling signal to the input of and-gate 14, no down count can occur due to the $\phi2$ clock pulses because and-gate 14 is inhibited by the low appearing at its other input from the output of and-gate 13. Accordingly, under these conditions the circuitry of FIG. 1 is inactive even though the clock pulses are regularly occurring at the inputs to and-gates 14, 19, 20 and 26. However, when a dial pulse signal appears, such as shown in FIG. 2, the following sequence of events occurs.

For the case illustrated in the showing of FIG. 2, it has been assumed that a 7 to 15 pulse per second system is being examined and that the parameters of the system are such that a minimum real-time dial pulse break signal of 37.5 milliseconds will be examined for before examining for a subsequent dial pulse make signal of 15 milliseconds. Further, an approximately 28 milliseconds weighted time interval will be examined for to determine that a valid dial break signal has occurred. These parameters are built into the apparatus in the following way.

The 37.5 millisecond real-time interval is counted by Binary Counter 11 since it receives a count each 2½ milliseconds from the $\phi1$ clock signal and 15 of such pulses are counted before the output of and-gate 24 goes high to provide one of the enabling signals to down counting and-gate 14 via and-gate 13. The approximately 28 millisecond weighted count for determining the occurrence of a valid dial pulse break signal is derived from the 11 count output of Decoder 10, the 11 count being the equivalent of 27.5 milliseconds plus a time interval which is indeterminate between 0 and 2½ milliseconds. With the Decoder 10 and Binary Counter 11 thus set for the times as described, the numbers below the V tip - V ring waveform for the TA+TB−TC line and the count information shown on FIG. 2 are correlated with the apparatus as shown in FIG. 1.

When the leading edge of the dial pulse waveform rises above the 11/12 on-hook level an Up-count is generated by the $\phi2$ clock pulse through and-gate 19 and or-gate 21 to the Up input of the Up/Down Counter 15. As seen from the waveform, this signal level remains above the 11/12 on-hook level for 14 milliseconds and corresponds to the TA period. During that time, six $\phi2$ pulses are counted up in the Counter 15, and in addition three $\phi1$ pulses are counted through and-gate 20 during the TB time interval when the waveform is above the + 60 volt level. Consequently at the end of 14 milliseconds of real time, the Up/Down Counter 15 has counted up to a count of 9 which appears in the Decoder 10 and looks like a real time interval of 22 milliseconds. When the Decoder 10 had reached a count of 5, a high appeared on one input of and-gate 28, but since the other input of and-gate 28 from the output of Latch Break Flip-Flop 17 is low, no signal passed therethrough to the clear input of the Up/Down Counter 15, and the counter retained its then count.

At the end of the first TA interval the signal falls below the 11/12 on-hook signal level and remains there for 6 milliseconds. This disables the and-gates 19 and 20 and enables down-count and-gate 14 which had its inhibit removed from it as soon as the Decoder 10 stepped off of the 0 count at its output. During the 6 millisecond TC interval, two $\phi 2$ pulses appear at and-gate 14 and step the Up/Down Counter 15 downward by two counts so that the count has reduced from 9 to 7 at the end of the first TC period. A second TA period is then shown which continues for 6 milliseconds and restores the count to 9 through Up-counting gate 19. A second TC interval occurs, this time for an interval of 7 milliseconds and again reduces the count in the decoder to a 7 count. The second TC interval is followed by another TA interval shown to be of 15 millisecond duration. Shortly after the beginning of this TA period, the Binary Counter 11 reaches its 15 count thus causing a high to appear at the output of and-gate 24 and at the input of or-gate 22 while at the same time changing the high enabling signal on and-gate 26 to a low inhibiting signal via inverter 25 and disabling further count inputs to the Counter 11 from the $\phi 1$ clock pulses. The count in Binary Counter 11 is thus held at a 15 count corresponding to 37.5 milliseconds.

During the final TA signal period of the V tip - V ring waveform, four additional $\phi 2$ clock pulses are counted up in Up/Down counter 15 via and-gate 19 so that the count in Decoder 10 rises from 7 to 11. A high signal is generated from the 11 count output of Decoder 10 which sets Latch Break Flip-Flop 17 and causes its Q output to become high thus putting a high enable signal on each of and-gates 16 and 28, both of which at this time have low signals on their other inputs. Additionally, the high signal from 11 count output of Decoder 10 is passed through inverter 18 as a low to thereby inhibit Up-counting and-gates 19 and 20. The 11 count of course corresponds to the 28 millisecond weighted time count previously discussed and is the indicator that a valid dial pulse break signal has been detected.

It is necessary to look for a TC signal of 15 millisecond minimum duration in order to determine that a dial pulse make signal has occurred, corresponding to a return to the off-hook level, and indicating the completion of a dial pulse signal. As shown on the V tip - V ring waveform, the signal level drops gradually down to the off-hook level and downcounts occur for each $\phi 2$ clock signal until six such counts have occurred stepping the count in the Decoder 10 downward from an 11 count to a 5 count. When the 5 count occurs, since and-gate 28 is now enabled due to the high output from Latch Break Flip-Flop 17, the 5 count signal is gated through and-gate 28 to the clear input of the Up/Down counter 15, clearing the Counter 15 and Decoder 10 back to 0 counts.

The 0 count clears Binary Counter 11, inhibits down-counting gate 14 via inverter 12 and gate 13, and passes a signal through enabled and-gate 16 to Delay Element 29 and generates the leading edge of the dial pulse count signal. After a delay determined by the Delay Element 29, the signal through and-gate 16 resets the Latch Break Flip-Flop 17 and drives its output low thereby inhibiting and-gate 16 and terminating the dial pulse signal. When the down-counting from the 11 count in the Decoder 10 started, gates 19 and 20 were of course again enabled so that up-counting could again occur if the falling signal level in the final TC period had turned upward above the 11/12 on-hook threshold level. This of course did not happen in the illustrated case and the countdown proceeded as has been previously described.

Figure 3:
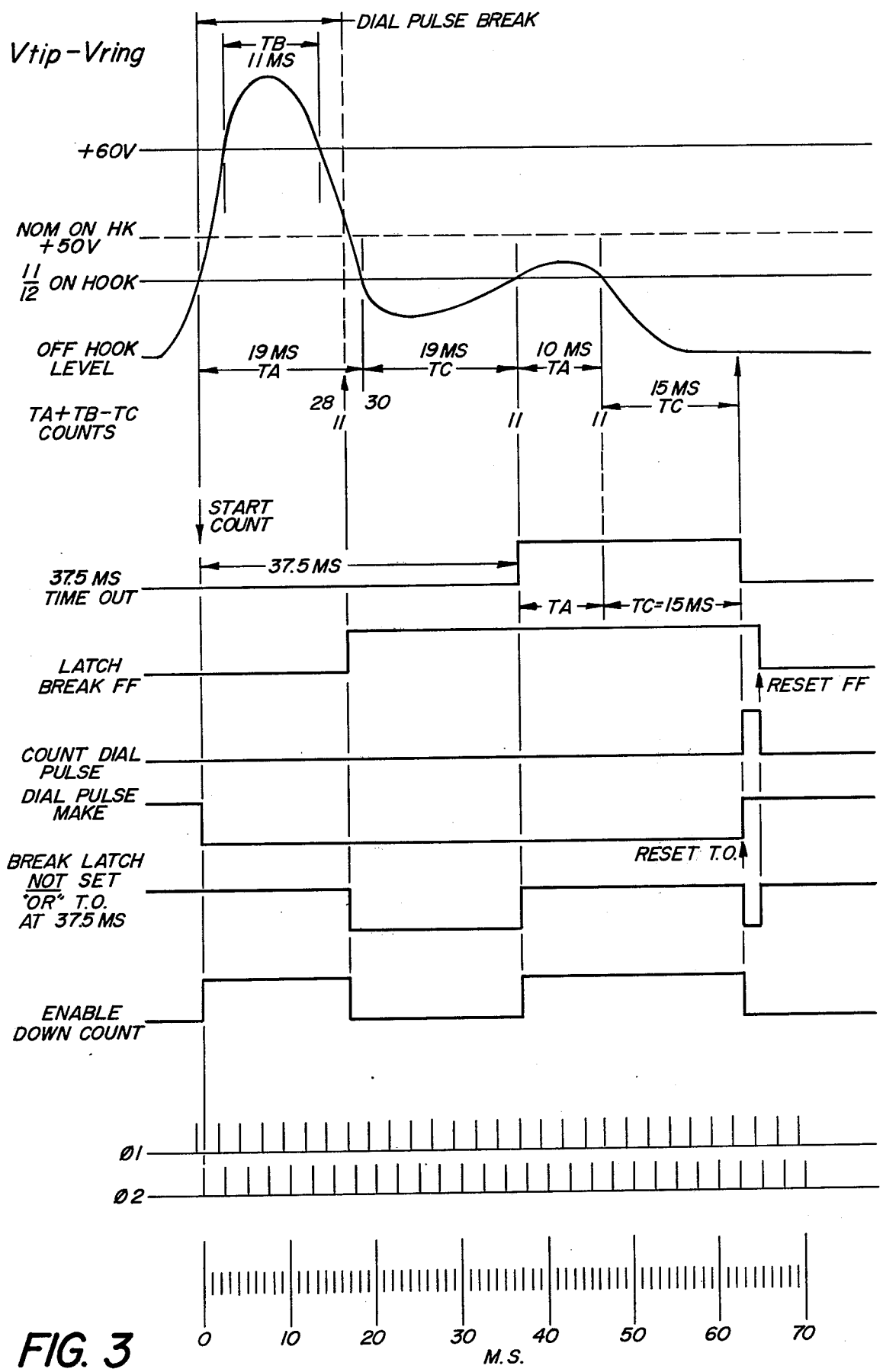
FIG. 3 is a timing waveform diagram similar to that shown in FIG. 2 but for a dial pulse signal of different characteristics.

Turning now to a consideration of the waveform of FIG. 3, a different condition is shown, namely, a signal condition in which the initial inductive waveform peak is of such amplitude and duration that a weighted count of 28 milliseconds, corresponding to an 11 count in the Decoder 10, occurs during the first 19 milliseconds of real-time, and would ordinarily then cause a search for a subsequent 15 millisecond TC period to be initiated, which if found would then generate an indication that a valid dial pulse break interval followed by a valid dial pulse make interval had occurred. Such an indication is not desired because it could lead to the generation of a second but spurious dial pulse count in the following manner. A dial pulse break signal could be as short as 40 milliseconds real-time unweighted, so that since the Counter 11 operates in real-time, there can not be anything but a break condition during this time interval. Therefore, because the weighting condition has been imposed on the system so that a valid break signal can be established in real-times much shorter than 40 milliseconds, the search for a make signal is delayed for approximately that length of time. Otherwise it would be possible to detect more than one apparently valid dial pulse signal in the real-time interval corresponding to but a single dial pulse signal time. For this reason, the beginning of the down-count for establishing a valid dial pulse make signal is inhibited until the 37.5 millisecond Binary Counter 11 has completed its count. This is brought about in the following way.

When the 11 count occurred in Decoder 10 signifying detection of a dial pulse break signal, the Latch Break Flip-Flop output went high causing a low to be generated by inverter 23 and appear at one input to or-gate 22. Since Binary Counter 11 had not as yet reached its 15 count, the output of and-gate 24 also appears as a low signal at the other input of or-gate 22. Consequently, the output of or-gate 22 which is presented to one input of and-gate 13 is a low signal, and therefore even though the other input to and-gate 13 from inverter 12 is a high signal, no high signal can be passed through and-gate 13 to the input of down-counting gate 14, and therefore down-count gate 14 is inhibited which prevents Up-/Down Counter 15 from counting down. This situation remains until Binary Counter 11 has timed out at 37.5 milliseconds in the manner previously described to thereby cause the output of and-gate 24 to go high and be passed through or-gate 22 and and-gate 13 and enable the down-counting through and-gate 14 to commence.

As shown in FIG. 3 however, at the time that the Binary Counter 11 times out so that down-counting could commence, the V tip - V ring waveform has transitioned from a TC interval to a TA interval and no down-counting can occur, but neither can up-counting occur because the count has already arrived at the count of 11 in Decoder 10 and therefore the up-counting gates 19 and 20 are inhibited. Accordingly, no counting whatever takes place during the second TA interval, and down-counting starts at the beginning of the second TC interval. Since the V tip - V ring signal level remains below the 11/12 on-hook level for 15 milliseconds, a down-count to 5 occurs in the previously described manner and a dial pulse count signal is generated, also as previously described.

Having now described our invention in connection with a particularly illustrated embodiment thereof, variations and modifications of our invention may now become apparent to those persons normally skilled in the art without departing from the essential scope or spirit of the invention, and accordingly it is intended to claim the same broadly as well as specifically as indicated by the appended claims.

What is claimed to be new and useful is:

1. Apparatus for detecting the occurrence of dial pulses on telephone lines in the presence of severe signal distortions due to line conditions, comprising in combination,
   a. first means responsive to the occurrence of a first signal level greater than a first selected threshold level to generate first count signals at regularly occurring spaced time intervals during the continuance of said first signal level,
   b. second means responsive to the occurrence of a second signal level less than said first selected threshold level to generate second count signals at regularly occurring spaced time intervals during the continuance of said second signal level,
   c. up/down counting means having input and output means,
      1. said first means being coupled to a part of said counting means input means and causing an up-count for each said first count signal,
      2. said second means being coupled to a part of said counting means input means and causing a down-count for each said second count signal,
   d. count signals interpreting means coupled to said counting means output means responsive to the detection of a selected up-count by said counting means followed by the detection of a selected down-count by said counting means to generate a dial pulse count signal designating that a valid dial pulse has been detected.

2. Apparatus as set forth in claim 1 further including third means responsive to the occurrence of a third signal level greater than a second selected threshold level to generate third count signals at regularly occurring spaced time intervals during the continuance of said third signal level.

3. Apparatus as set forth in claim 1 further including third means responsive to the occurrence of a third signal level greater than a second selected threshold level to generate third count signals at regularly occurring spaced time intervals during the continuance of said third signal level, said third means being coupled to a part of said counting means input means and causing an up-count for each said third count signal.

4. Apparatus as set forth in claim 1 wherein said second signal level includes all signal levels less than said first selected threshold level.

5. Apparatus as set forth in claim 1 wherein the time intervals between said second count signals is the same as the time intervals between said first count signals.

6. Apparatus as set forth in claim 1 wherein said count signals interpreting means includes inhibit means effective to inhibit up-counting by said up/down counting means upon detection of the aforesaid selected up-count.

7. Apparatus as set forth in claim 1 wherein said count signals interpreting means includes inhibit means coupled to said first means effective to inhibit up-counting by said up/down counting means by inhibiting said first means from generating said first count signals as long as said selected up-count is registered in said counting means.

8. Apparatus as set forth in claim 1 wherein said count signals interpreting means includes inhibit means effective to inhibit down-counting by said up/down counting means when the count registered in said counting means is a zero count.

9. Apparatus as set forth in claim 1 wherein said count signals interpreting means includes inhibit means coupled to said second means effective to inhibit down-counting by said up/down counting means by inhibiting said second means from generating said second count signals when the count registered in said counting means is a zero count.

10. Apparatus as set forth in claim 1 wherein said count signals interpreting means comprises real-time counting means effective to inhibit down counting by said up/down counting means when said selected up-count is registered in said up/down counting means and said real-time counting means has not as yet counted to the end of a pre-selected real-time interval.

11. Apparatus as set forth in claim 1 wherein said count signals interpreting means comprises real-time counting means effective to inhibit down counting by said up/down counting means when said selected up-count is registered in said up/down counting means and said real-time counting means has not yet counted to the end of a pre-selected real-time interval, said real-time counting means being cleared to a zero time count whenever the count registered in said up/down counting means is a zero count.

12. Apparatus as set forth in claim 1 wherein said count signals interpreting means comprises real-time counting means operatively coupled to said second means and effective to inhibit down-counting by said up/down counting means by inhibiting said second means from generating said second count signals when said selected up-count is registered in said up/down counting means and said real-time counting means has not as yet counted to the end of a pre-selected real-time interval, said real-time counting means being cleared to a zero time count whenever the count registered in said up/down counting means is a zero count.

13. Apparatus as set forth in claim 1 wherein said count signals interpreting means comprises monitor means which registers the detection of the aforesaid selected up-count and examines for the subsequent occurrence of the aforesaid selected down-count, and upon detection of the latter clears the up/down counting means to a zero count and generates the dial pulse count signal.

14. Apparatus as set forth in claim 3 wherein said second selected threshold level is greater than said first selected threshold level.

15. Apparatus as set forth in claim 3 wherein the time intervals between said third count signals is the same as the time intervals between said first count signals.

16. Apparatus as set forth in claim 3 wherein the time intervals between said third count signals is the same as the time intervals between said first count signals but said first count signals and said second count signals occur at different real times.

17. Apparatus as set forth in claim 3 wherein said count signals interpreting means includes inhibit means coupled to said first and third means effective to inhibit up-counting by said up/down counting means by inhibiting said first and third means from generating said first and third count signals as long as said selected up-count is registered in said counting means.

18. Apparatus as set forth in claim 3 wherein said count signals interpreting means includes inhibit means coupled to said second means effective to inhibit down-counting by said up/down counting means by inhibiting said second means from generating said second count signals when the count registered in said counting means is a zero count.

19. Apparatus as set forth in claim 3 wherein said count signals interpreting means comprises real-time counting means operatively coupled to said second means and effective to inhibit down-counting by said up/down counting means by inhibiting said second means from generating said second count signals when said selected up-count is registered in said up/down counting means and said real-time counting means has not as yet counted to the end of a pre-selected real-time interval, said real-time counting means being cleared to a zero time count whenever the count registered in said up/down counting means is a zero count.

20. Apparatus as set forth in claim 3 wherein said count signals interpreting means comprises monitor means which registers the detection of the aforesaid selected up-count and examines for the subsequent occurrence of the aforesaid selected down-count, and upon detection of the latter clears the up/down counting means to a zero count and generates the dial pulse count signal.

21. Apparatus as set forth in claim 17 wherein said count signals interpreting means includes inhibit means coupled to said second means effective to inhibit down-counting by said up/down counting means by inhibiting said second means from generating said second count signals when the count registered in said counting means is a zero count.

22. Apparatus as set forth in claim 17 wherein said count signals interpreting means comprises real-time counting means operatively coupled to said second means and effective to inhibit down-counting by said up/down counting means by inhibiting said second means from generating said second count signals when said selected up-count is registered in said up/down counting means and said real-time counting means has not as yet counted to the end of a pre-selected real-time interval, said real-time counting means being cleared to a zero time count whenever the count registered in said up/down counting means is a zero count.

23. Apparatus as set forth in claim 17 wherein said count signals interpreting means comprises monitor means which registers the detection of the aforesaid selected up-count and examines for the subsequent occurrence of the aforesaid selected down-count, and upon detection of the latter clears the up/down counting means to a zero count and generates the dial pulse count signal.

24. Apparatus as set forth in claim 21 wherein said count signals interpreting means comprises real-time counting means operatively coupled to said second means and effective to inhibit down-counting by said up/down counting means by inhibiting said second means from generating said second count signals when said selected up-count is registered in said up/down counting means and said real-time counting means has not as yet counted to the end of a pre-selected real-time interval, said real-time counting means being cleared to a zero time count whenever the count registered in said up/down counting means is a zero count.

25. Apparatus as set forth in claim 24 wherein said count signals interpreting means comprises monitor means which registers the detection of the aforesaid selected up-count and examines for the subsequent occurrence of the aforesaid selected down-count, and upon detection of the latter clears the up/down counting means to a zero count and generates the dial pulse count signal.

26. Apparatus as set forth in claim 24 wherein said second selected threshold level is greater than said first selected threshold level.

27. Apparatus as set forth in claim 26 wherein the time intervals between said third count signals is the same as the time intervals between said first count signals but said first count signals and said second count signals occur at different real times.

28. Apparatus for detecting the occurrence of dial pulses on telephone lines in the presence of severe signal distortions due to line conditions, comprising in combination,
   a. up/down counting means having an up counting input, a down-counting input, a count clearing input, a low count output, an intermediate count output and a high count output,
   b. up-count gate means having an input and an output, said output being operatively coupled to said counting means up-counting input, said up-count gate means being responsive to the occurrence at said gate means input of all signal levels greater than a first selected threshold level to generate up-count signals at regularly occurring spaced time intervals during the continuance of said signal level condition,
   c. down-count gate means having an input and an output, said output being operatively coupled to said counting means down-counting input, and said down-count gate means being responsive to the occurrence at said gate means input of all signal levels less than said first selected threshold level to generate down-count signals at regularly occurring spaced time intervals during the continuance of said signal level condition,
   d. up-count storage means having an input and an output, said input being operatively coupled to said counting means high count output, and being effective responsive to the registration in said counting means of said high count to store a high count indicator and generate a high count output signal at its output, said up-count gate means comprising at least first and second gate means, said first gate means being responsive as aforesaid to all signal levels greater than said first selected threshold level to generate up-counts, and said second gate means being responsive to the occurrence of all signals greater than a second selected threshold level greater than said first selected threshold level to generate up-count signals at regularly occurring spaced time intervals during the continuance of said second threshold level signals,
   e. monitor means having inputs respectively operatively coupled to said counting means intermediate count output and to the output of said up-count storage means, and having an output operatively coupled to said counting means count clearing input, said monitor means being effective responsive to signals at its inputs indicating the occurrence of a stored high count followed by the occurrence of an intermediate count to clear said counting means to its said low count and generate a dial pulse signal.

29. Apparatus as set forth in claim 28 further including up-count gate inhibiting means having an input operatively coupled to said counting means high count output and having an output operatively coupled to said up-count gate means input, whereby said inhibiting means inhibits up-counting through said gate means whenever said counting means registers a high count at its high count output.

30. Apparatus as set forth in claim 28 further including down-count gate inhibiting means having an input operatively coupled to said counting means low count output and having an output operatively coupled to said down-count gate means input, whereby said inhibiting means inhibits down-counting through said gate means whenever said counting means registers a low count at its low count output.

31. Apparatus as set forth in claim 28 further including real-time counting means having an output, said output and the output of said up-count storage means being operatively coupled to said down-count gate means input in such a way that the output of said real-time counting means inhibits down-counting through said down-count gate means when said up-count storage means has generated its high count output signal and said real-time counting means has not as yet counted to the end of a pre-selected real-time interval.

32. Apparatus as set forth in claim 28 wherein the time intervals between the up-count signals from said first gate means is the same as the time intervals between the up-count signals from said second gate means but the up-count signals from said first and second gate means occur at different real-times.

33. Apparatus as set forth in claim 29 further including down-count gate inhibiting means having an input operatively coupled to said counting means low count output and having an output operatively coupled to said down-count gate means input, whereby said inhibiting means inhibits down-counting through said gate means whenever said counting means registers a low count at its low count output.

34. Apparatus as set forth in claim 33 further including real-time counting means having an output, said output and the output of said up-count storage means being operatively coupled to said down-count gate means input in such a way that the output of said real-time counting means inhibits down-counting through said down-count gate means when said up-count storage means has generated its high count output signal and said real-time counting means has not as yet counted to the end of a pre-selected real-time interval.

35. Apparatus as set forth in claim 34 wherein said real-time counting means further includes a count clearing input operatively coupled to said counting means low count output, said real-time counting means being cleared to a zero time count whenever said counting means registers a low count at its low count output.

* * * * *